UNITED STATES PATENT OFFICE.

EMILE A. FOURNEAUX, OF NEW YORK, N. Y., ASSIGNOR TO HERMAN A. METZ, OF BROOKLYN, NEW YORK.

BLUE BASIC DYE AND PROCESS OF MAKING SAME.

SPECIFICATION forming part of Letters Patent No. 726,667, dated April 28, 1903.

Application filed July 5, 1902. Renewed March 10, 1903. Serial No. 147,152. (No specimens.)

*To all whom it may concern:*

Be it known that I, EMILE A. FOURNEAUX, Ph. D., a citizen of the United States, residing in New York, borough of Manhattan, and State of New York, have invented certain new and useful Improvements in Blue Basic Dyes and Processes of Making the Same, of which the following is a specification.

I have found that valuable new blue basic dyes of great fastness can be obtained by treating the asymmetrical dimethyl or diethylphenosafranins in ice-cold acid solution with an alkaline nitrite, using the same in the proportion of one-half molecule to one molecule of the safranin and then transposing the intermediary product formed by allowing the neutral or slightly-acid solution to stand for some time at ordinary temperature or by heating it to the boil, or both.

By treating one molecule of dimethylphenosafranin with one molecule of an alkaline nitrite in acid solution the safranin is transformed into a diazo compound which is well known and which has been used for the manufacture of dyes by copulating it with amins or phenols. Like most diazo compounds, the one derived from dimethylphenosafranin is unstable and decomposed by heating or even if its solution is allowed to stand for some time at ordinary temperature. The products of this decomposition have not been studied to my knowledge. Normally it should yield the dimethylaminobenzolindon or dimethylphenosafraninon, which has been synthetically prepared by Jaubert, which forms red crystals and possesses no tinctorial value. As a matter of fact, however, this product is not formed by the decomposition of this diazo compound.

On standing at ordinary temperature or by boiling the light-greenish-blue solution of the diazo compound it gradually turns a dark purplish blue, while nitrogen is given off in gas form. From this dark-blue solution a new blue basic dye can be precipitated by the addition of common salt and zinc chlorid. This dye, however, is also of little tinctorial value, as it gives dull and weak gray-blue shades.

Far better results are obtained when the proportion of nitrite used in the reaction is reduced to one-half molecule as against one molecule of the safranin. In this case a valuable dark purplish blue is formed, which is the object of the present application. When substituting the asymmetrical diethylphenosafranin for the dimethyl, very similar results are obtained throughout.

In preparing these dyes it is necessary in order to obtain the best results to use strictly only one-half molecule of the alkaline nitrite to one molecule of the safranin. Otherwise a certain proportion of the undesirable grayish-blue dye described above is formed, to the detriment of the brightness and strength of the dye. When less than one-half a molecule of nitrite is used, a certain amount of the safranin remains unchanged, which is equally detrimental to the result.

Example: Thirty-five pounds of the dimethylphenosafranin, commercially known as methylene violet (3RA) and prepared by suitably oxidizing a mixture of dimethyl-paraphenylendiamin and anilin, are dissolved in two thousand pounds water, and a solution of three and one-half pounds nitrite of soda in thirty-five pounds water is gradually added, while keeping the temperature of the solution near the freezing-point and stirring constantly. To this are added gradually thirty pounds hydrochloric acid of 36° Twaddell diluted with three parts of water. The ice-cold solution is then stirred constantly for an hour, when thirty pounds of a caustic-soda solution of 77° Twaddell diluted with three parts of water are added and the solution allowed to stand one day. After this five pounds of fifty-per-cent. acetic acid diluted with three parts of water are added, the solution brought to a boil, and boiled for one hour. The dyestuff is then precipitated, as usual, with salt and preferably with an addition of zinc chlorid. It forms a dark purplish powder with bronzy reflex, is readily soluble in water and alcohol, dissolves in concentrated sulfuric acid with a yellow-green color which turns blue on dilution. When treated with zinc-dust and acetic acid, the solution of the dye become rapidly yellow with a green fluoresence. When this solution thus treated is filtered and exposed to the air, it gradually assumes a carmine tint with yellow fluorescence and eventually becomes purplish blue. These reactions are characteristic of the dye. The reactions given by the dye derived from diethylphenosafranin are similar in every respect.

Having thus described my invention, I claim as new and desire to secure by Letters Patent—

1. The process of manufacture of new blue basic dye, consisting in treating an acid ice-cold solution of the asymmetrical dimethylphenosafranin with a quantity of an alkaline nitrite corresponding to one-half molecule of the nitrite for one molecule of the safranin and then transforming the intermediary product formed by allowing the neutral or slightly-acid solution to stand at ordinary temperature for some time, or heating it to the boil, substantially as set forth.

2. A blue dye obtained from asymmetrical dimethylphenosafranin and an alkaline nitrite, forming a dark purplish powder which is readily soluble in water and alcohol, dissolving in concentrated sulfuric acid with a yellow-green color which turns blue on dilution, turning yellow with a green fluorescence when a solution of the dye is treated with zinc-dust and acetic acid and forming a carmine tint with yellow fluorescence when the solution so treated is exposed to the air, after which it assumes a purplish-blue tint, substantially as set forth.

In testimony that I claim the foregoing as my invention I have signed my name in presence of two subscribing witnesses.

EMILE A. FOURNEAUX.

Witnesses:
PAUL GOEPEL,
HENRY J. SUHRBIER.